United States Patent
Bodas et al.

(10) Patent No.: US 12,515,184 B2
(45) Date of Patent: Jan. 6, 2026

(54) THERMAL SLEEVE FOR HOT-WALL DEHYDROGENATION REACTOR

(71) Applicant: SABIC Global Technologies B.V., Bergen op Zoom (NL)

(72) Inventors: Vijay Bodas, Riyadh (SA); Mohammed Ansari, Riyadh (SA)

(73) Assignee: SABIC Global Technologies B.V., Bergen op Zoom (NL)

( * ) Notice: Subject to any disclaimer, the term of this patent is extended or adjusted under 35 U.S.C. 154(b) by 680 days.

(21) Appl. No.: 17/785,498

(22) PCT Filed: Dec. 17, 2020

(86) PCT No.: PCT/IB2020/062115
§ 371 (c)(1),
(2) Date: Jun. 15, 2022

(87) PCT Pub. No.: WO2021/137082
PCT Pub. Date: Jul. 8, 2021

(65) Prior Publication Data
US 2023/0024510 A1    Jan. 26, 2023

(30) Foreign Application Priority Data

Dec. 30, 2019    (EP) .................................. 19220101

(51) Int. Cl.
*B01J 8/00* (2006.01)
*B01J 8/02* (2006.01)

(52) U.S. Cl.
CPC .............. *B01J 8/008* (2013.01); *B01J 8/025* (2013.01); *B01J 2219/00876* (2013.01); *B01J 2219/1943* (2013.01); *B01J 2219/2448* (2013.01)

(58) Field of Classification Search
CPC ........ B01J 8/008; B01J 8/025; B01J 19/0053; B01J 19/0006; B01J 4/001;
(Continued)

(56) References Cited

U.S. PATENT DOCUMENTS 2,915,375 A * 12/1959 Shirk .................... B01J 8/0278
422/220
4,079,967 A * 3/1978 Schoessow .......... G21C 13/036
976/DIG. 173
(Continued)

FOREIGN PATENT DOCUMENTS

| CN | 200998659 Y | 1/2008 |
| CN | 200998660 Y | 1/2008 |

(Continued)

OTHER PUBLICATIONS

The Witzenmann Group. (n.d.). *Fluid Catalytic Cracking.* At p. 4. Retrieved Jun. 15, 2022 from https://www.witzenmann.com/en/solutions/industry/plant-construction-pipeline-construction/. 5 pages.
(Continued)

*Primary Examiner* — Lessanework Seifu
(74) *Attorney, Agent, or Firm* — Norton Rose Fulbright US LLP (57) ABSTRACT

Systems, devices, and methods for transferring heat associated with an interface corresponding to a reactor. In some aspects, a system includes a sleeve having a body portion that defines a channel that extends from a first end to a second end of the body portion. The channel is configured to define a flow path that extends through a flange that is coupled to a pipe via a welding point a lip portion extending radially away from the first end and configured to be positioned between the flange and a reactor.

17 Claims, 5 Drawing Sheets

(58) Field of Classification Search
CPC .... B01J 2208/00477; B01J 2208/00026; B01J 2219/00119; B01J 2219/0015; B01J 2219/00155; B01J 2219/2448; B01J 2219/00876

See application file for complete search history.

(56) References Cited

U.S. PATENT DOCUMENTS

| | | | |
|---|---|---|---|
| 4,174,123 A * | 11/1979 | Schluderberg | G21D 1/006 976/DIG. 173 |
| 4,187,955 A * | 2/1980 | Dorling | B01J 3/002 220/560.05 |
| 4,441,544 A | 4/1984 | McCurley | |
| 4,844,274 A * | 7/1989 | Sterk | F22B 37/228 122/362 |
| 5,350,011 A | 9/1994 | Sylvester | |
| 5,775,269 A | 7/1998 | Lawrence | |
| 6,471,249 B1 | 10/2002 | Lewis | |
| 9,829,124 B2 * | 11/2017 | Dill | F16L 9/20 |
| 2001/0040024 A1 | 11/2001 | Blanda, Jr. et al. | |
| 2003/0236441 A1 * | 12/2003 | Clem | B01J 19/26 422/600 |
| 2004/0129373 A1 | 7/2004 | Nadarajah et al. | |
| 2009/0072530 A1 | 3/2009 | Calhoun | |
| 2012/0034148 A1 | 2/2012 | Schwefer et al. | |

FOREIGN PATENT DOCUMENTS

| | | |
|---|---|---|
| CN | 107530677 A | 1/2018 |
| CN | 110268216 A | 9/2019 |

OTHER PUBLICATIONS

Extended European Search Report from European Application No. 19220101.0 dated Jul. 30, 2020, 9 pages.

International Search Report and Written Opinion from PCT/IB2020/062115 dated Mar. 2, 2021, 11 pages.

* cited by examiner

THERMAL SLEEVE FOR HOT-WALL DEHYDROGENATION REACTOR

CROSS-REFERENCE TO RELATED APPLICATIONS

This application is a national phase application under 35 U.S.C. § 371 of International Application No. PCT/IB2020/062115 filed Dec. 17, 2020, which claims priority to European Patent Application No. 19220101.0 filed Dec. 30, 2019. The entire contents of each of the above-referenced disclosures is specifically incorporated by reference herein without disclaimer.

TECHNICAL FIELD

The present disclosure relates generally to sleeves for use with a reactor, and more specifically, but not by way of limitation, to a sleeve for insulating components associated with a hot-wall dehydrogenation reactor.

BACKGROUND

Dehydrogenation reactors are used in olefin production by dehydrogenating hydrocarbons, such as paraffins, in the presence of catalysts to create a double bond structure. Such processes are highly endothermic and require operation temperatures of 500° C. and above. Additionally, the flow into the dehydrogenation reactor is typically sonic requiring a critical flow orifice upstream of the dehydrogenation reactor. While critical flow orifices generate sonic flow in the system, they also generate downstream shock flow that can damage piping. As a result, the inlet piping for a dehydrogenation reactor must be able to withstand high temperatures, wide ranging temperature variations during operation, and vibrational stresses from the shock flow.

Dehydrogenation reactors may have a hot- or cold-wall design. Cold-wall designs typically use an internal refractory lining that is shrouded and can be susceptible to failure and erosion leading to outages and reduction of reactor output. Hot-wall designs are typically inefficient for endothermic reactions, such as dehydrogenation. For example, hot-wall designs require a large amount of heat to keep the pipe wall at a desired temperature. Hot-wall designs are also subject to large cyclic thermal stress that accompanies the dehydrogenation process, which can create cracks in connected piping and to connectors and welds that connect the piping at the hydrocarbon inlet. Failure of the piping, connectors, and/or welds can lead to outages and reduce a reactor output.

SUMMARY

The present disclosure is generally related to systems, devices, and methods of insulating one or more components of a reactor, such as dehydrogenation reactor. For example, to insulate components from effects, such as thermal or pressure effects, of a reaction process, a sleeve is configured to be positioned in an inlet pipe of the reactor to allow convective heat transfer behind the sleeve and reduce the thermal cycling exposure to the pipe and associated connectors. To illustrate, the sleeve may include a body portion defining a channel that is configured to be inserted into a pipe and a flange of the reactor and to define the flow path of the reactor through the flange. In this way, a connector that couples the pipe to the flange may be insulated from thermal oscillations as forced convection of the fluid is applied to the sleeve instead of the flange. The sleeve may also include a lip portion extending away from an end of the body portion and that is configured to be positioned between the flange and a reactor to couple the flange to the reactor. Accordingly, the sleeve may decrease heat transfer from the dehydrogenation process to the flange, pipe, and connectors of the reactor. Consequentially, as compared to a conventional system without use of the sleeve, the sleeve may enable longer run length for the hot-wall pipe, enhance safety and operability, and reduce maintenance work during turnarounds or from pipe failure.

Some implementations of the present systems include a sleeve having a body portion that defines a channel of the body portion that extends from a first end to a second end of the body portion. The channel of the body portion configured to define a flow path that extends through a flange that is coupled to a pipe via a welding interface. The sleeve also includes a lip portion extending radially away from the first end and configured to be positioned between the flange and a reactor. In some such implementations, the lip portion extends between a first end coupled to the first end of the body portion and a second end. Additionally, or alternatively, the channel of the body portion may define a longitudinal axis that is oriented orthogonal to a plane extending between the first end and the second end of the lip portion.

In some of the foregoing implementations of the present systems, the body portion defines a first opening at the first end and a second opening at the second end. Additionally, or alternatively, the lip portion may be configured to be positioned between the flange and a port of the reactor such that a first portion of the body portion is disposed within a channel of the flange and a second portion of the body portion is disposed within a channel of a pipe coupled to the flange via an interface. In some implementations, the lip portion is further configured to be positioned between the flange and a port of the reactor such that the channel of the body portion defines a flow path between the pipe and the port of the reactor.

In some of the foregoing implementations of the present systems, the system further includes a reactor, a flange, a pipe, or a combination thereof. The flange may define a channel of the flange that extends from a first end of the flange to a second end of the flange. Additionally, or alternatively, the flange may be coupled to a port of the reactor via the first end of the flange. In some such implementations, the flange is a weld neck flange or a lap joint flange. In some implementations, the pipe defines a channel of the pipe, the pipe coupled to the second end of the flange. Additionally, or alternatively, the reactor may include a hot wall dehydrogenation reactor and/or the welding interface may include a metal weld.

In some of the foregoing implementations of the present systems, the body portion includes a first portion disposed within the channel of the flange and a second portion disposed within the channel of the pipe. In some such implementations, the first end of the body portion and the second end of the body portion may be positioned outside the channel of the flange. Additionally, or alternatively, the channel of the body portion may include a maximum transverse dimension that is less than or equal to 90% of the maximum transverse dimension of the channel of the flange. Some implementations of the present methods (e.g., of insulating an interface between components of a reactor) include, at a sleeve including a body portion that defines a channel of the body portion that extends from a first end to a second end of the body portion, a lip portion extending radially away from the first end, performing: receiving, by sleeve positioned between two components of a reactor, an output of the reactor via the first end of the sleeve; transporting, via the sleeve, the output of the reactor through the channel of the body portion from the first end to the second end; and conducting, by the sleeve, heat from the output of the reactor to insulate a connection interface between the components.

In some of the foregoing implementations of the present methods, the method may further include coupling the sleeve to a port of the reactor and positioning the body portion of the sleeve within a portion of each of the components. In some implementation, the components may include at least a flange and a pipe, the output of the reactor may include an exhaust gas. Additionally, or alternatively, the method may further include defining a flow path from the reactor, to the port, to an inlet of the channel of the body portion, to an outlet of the channel of the body portion, and to the pipe and directing the exhaust gas from the reactor through the channel of the body portion to a location that is downstream from the connection interface.

In some of the foregoing implementations of the present methods, the method may also include positioning the lip portion between the flange and the port such that a first portion of the body portion is disposed within a channel of the flange and a second portion of the body portion is disposed within a channel of the pipe. In some such implementations, the first portion of the body portion defines the inlet of the channel of the body portion, the second portion of the body portion defines the outlet of the channel of the body portion, and/or the inlet and the outlet are positioned outside the channel of the flange. Additionally, or alternatively, the reactor may be a hot wall dehydrogenation reactor, the connection interface may include a metal welding.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "about" as used herein can allow for a degree of variability in a value or range, for example, within 10%, within 5%, or within 1% of a stated value or of a stated limit of a range and includes the exact stated value or range.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

In the context of the present invention, at least 15 embodiments are described. Embodiment 1 relates to a system for transferring heat associated with an interface corresponding to a reactor. The system comprises a sleeve comprising a body portion that defines a channel of the body portion that extends from a first end to a second end of the body portion, the channel of the body portion configured to define a flow path that extends through a flange that is coupled to a pipe via a welding point; and a lip portion extending radially away from the first end and configured to be positioned between the flange and a reactor. Embodiment 2 is the system of embodiment 1, wherein the lip portion extends between a first end coupled to the first end of the body portion; and a second end; and the channel of the body portion defines a longitudinal axis that is orthogonal to the lip portion. Embodiment 3 is the system of any of embodiments 1 to 2, wherein the body portion defines a first opening at the first end and a second opening at the second end. Embodiment 4. The system of any of preceding embodiments, wherein the lip portion is configured to be positioned between the flange and a port of the reactor such that a first portion of the body portion is disposed within a channel of the flange and a second portion of the body portion is disposed within a channel of a pipe coupled to the flange via an interface. Embodiment 5 is the system of any of the preceding embodiments, wherein the lip portion is further configured to be positioned between the flange and a port of the reactor such that the channel of the body portion defines a flow path between the pipe and the port of the reactor. Embodiment 6 the system of any of the preceding embodiments, further comprising the reactor; and the flange defining the channel of the flange that extends from a first end of the flange to a second end of the flange, the flange coupled to the port via the first end of the flange; and the pipe defining the channel of the pipe, the pipe coupled to the second end of the flange. Embodiment 7 is the system of any of the preceding embodiments, wherein the reactor comprises a hot wall dehydrogenation reactor; and the interface comprises a welding point. Embodiment 8 is the system of any of preceding embodiments, wherein the body portion comprises a first portion disposed within the channel of the flange and a second portion disposed within the channel of the pipe; and the first end of the body portion and the second end of the body portion are positioned outside the channel of the flange. Embodiment 9 is the system of any of the preceding embodiments, wherein the channel of the body portion comprises a maximum transverse dimension that is less than or equal to 90% of the maximum transverse dimension of the channel of the flange. Embodiment 10 is the system of any of the preceding embodiments, wherein the flange is a weld neck flange or a lap joint flange.

Embodiment 11 is a method of insulating an interface between two components of a reactor. The method comprises receiving, by a sleeve positioned between two components of a reactor, an output of the reactor, the sleeve comprising a body portion that defines a channel of the body portion that extends from a first end to a second end of the body portion; and a lip portion extending radially away from the first end; transporting, by the sleeve, the output of the reactor through the channel of the body portion from the first end to the second end; conducting, by the sleeve, heat from the output of the reactor; and insulating, by the sleeve, a connection point of the two components. Embodiment 12 is the method of embodiment 11, further comprising coupling the sleeve to a port of the reactor; and positioning the body portion of the sleeve within the two components; and wherein the two components comprise a flange and a pipe; and the output of the reactor comprises an exhaust gas. Embodiment 13 is the method of embodiment 12, further comprising defining a flow path from the reactor, to the port, to an inlet of the channel of the body portion, to an outlet of the channel of the body portion, and to the pipe; and directing the exhaust gas from the reactor through the channel of the body portion to a location that is downstream from a connector. Embodiment 14 is the method of any of embodiments 11-13, further comprising positioning the lip portion between the flange and the port such that a first portion of the body portion is disposed within a channel of the flange and a second portion of the body portion is disposed within a channel of the pipe; and wherein the first portion of the body portion defines the inlet of the channel of the body portion; the second portion of the body portion defines the outlet of the channel of the body portion; and the inlet and the outlet are positioned outside the channel of the flange. Embodiment 15 is the method of any of embodiments 11-15, wherein the reactor is a hot wall dehydrogenation reactor; and the connector comprises a weld.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps. Any implementation of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

Some details associated with the implementations are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1:
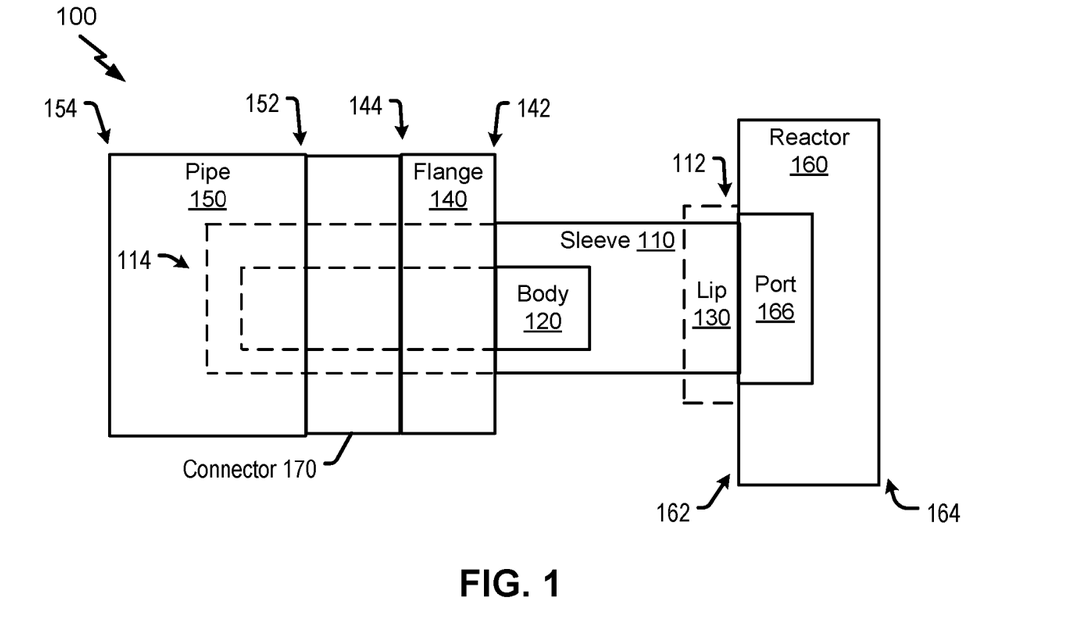
FIG. 1 is a diagram that illustrates an example of an insulation system for use in a dehydrogenation process.

Referring to FIG. 1, an example of an insulation system for transferring heat associated with an interface of a reactor is shown and designated 100. Although referred to herein as insulation system 100, system 100 may also be referred to herein as heat transfer system, a thermal sleeve assembly, a hot-wall dehydrogenation assembly, reactor assembly, or a hot-wall dehydrogenation system. As shown in FIG. 1, system 100 includes a sleeve 110, a flange 140, a pipe 150, a reactor 160, or a combination thereof. Components (e.g., 110, 140, 150, and/or 160) of system 100 may be coupled with (e.g., in contact with, mounted, and/or secured to) at least one other component of the system 100. In some implementations, multiple components of system 100 may be coupled to form a flow path of system 100. For example, sleeve 110 may be coupled to reactor 160 and to flange 140. Flange 140 may be coupled to sleeve 110, reactor 160, and/or to pipe 150. To illustrate, flange 140 may be coupled to reactor 160 via one or more connectors, such as bolts or screws, and may be coupled to pipe 150 via a connector 170, such as a weld joint. In some implementations, system 100 includes one or more additional components, such as one or more pumps, gravity separators, turbines, valves, catalysts, a combination thereof, or the like, as illustrative, non-limiting example, which are not shown for convenience.

Sleeve 110 includes first and second ends 112, 114. As shown, first end 112 is opposite second end 114. Sleeve 110 may be coupled to one or more other components (e.g., 140, 150, 160) of system 100. For example, sleeve 110 may be connected or mounted, directly or indirectly, to flange 140, pipe 150, and/or reactor 160. In some implementations, sleeve 110 may be interposed between at least two components of system 100. To illustrate, first end 112 may be coupled to one component (e.g., reactor 160). Optionally, second end 114 may be coupled to another component (e.g., pipe 150). Sleeve 110 may facilitate heat transfer. To illustrate, sleeve 110 may include a cast or forged metal configured to thermally insulate one or more components of system 100 from thermal cycling exposure. In a non-limiting example, sleeve 110 includes cast iron.

Sleeve 110 may include a body portion 120 (e.g., a body) and a lip portion 130 (e.g., a lip). In some implementations, body and lip portions 120, 130 are unitary such that the body and lip portions cooperate to define sleeve 110. To illustrate, lip 130 may be at least partially defined by first end 112 and body 120 may be at least partially defined by second end 114. Additionally, or alternatively, body portion 120 may be at least partially defined by first end 112 of sleeve 110. For example, body portion 120 may extend from first end 112 to second end 114. In some implementations, sleeve 110 may not include a lip (e.g., 130).

Flange 140 includes a first end 142 and a second end 144 that is opposite first end 142. Flange 140 may be configured to couple two or more components of system 100. For example, flange 140 may couple reactor 160 and/or sleeve 110 to pipe 150. To illustrate, first end 142 may be coupled to reactor 160 and second end 144 may be coupled to pipe 150. Additionally, or alternatively, flange 140 may be coupled to sleeve 110. To illustrate, first end 142 of flange 140 may be coupled to first end 112 of sleeve 110, such as coupled to or in contact with lip 130.

Pipe 150 includes a first end 152 and a second end 154 that is opposite first end 152. Pipe 150 may be configured to transport a fluid (e.g., liquid, gas, or combination thereof) through a portion of the flow path of system 100 (e.g., from first end 152 to second end 154). Pipe 150 may be configured to couple to one or more other components of system 100. In some implementations, pipe 150 is coupled to sleeve 110 and/or flange 140. For example, first end 152 may be coupled to second end 114 of sleeve 110. Additionally, or alternatively, first end 152 may be coupled to second end 144 of flange 140. In some implementations, pipe 150 is in fluid communication with sleeve 110, flange 140, and/or reactor 160. Pipe 150 may include a straight pipe, a bent pipe (e.g., inlet cactus piping piece), or any suitable piping of system 100. In some implementations, system 100 includes two pipes (e.g., 150) coupled together via a first flange (e.g., 140) and a second flange (e.g., 140). In such configurations, sleeve 110 may be coupled to the first flange, the second flange, or both to transfer heat away from the pipes (e.g., 150) and the flanges (e.g., 140). In implementations with two sleeves, a first end (e.g., 112) of a first sleeve (e.g., 110) may be coupled to a first end (e.g., 112) of a second sleeve (e.g., 110) to define at least a portion of a flow path.

Reactor 160 may define a body having a chamber in which a reaction (e.g., chemical reaction) occurs. For example, reactor 160 may include a catalytic reactor for hot-wall dehydrogenation. In some implementations, reactor 160 includes a fixed bed catalytic reactor. Reactor 160 includes a first end 162 (e.g., a first side) and a second end 164 (e.g., a second side). Reactor 160 further includes at least one port, such as a representative port 166. Port 166 may include an inlet or an outlet of reactor 160. Port 166 is configured to receive or deliver a fluid or gas. For example, port 166 may enable reactor 160 to be in fluid communication with one or more other components (e.g., 110, 140, 150) of system 100. To illustrate, port 166 may be coupled to flange 140 and/or sleeve 110 to define a flow path (e.g., of 100).

System 100 includes one or more interfaces, referred to herein as one or more connection point(s), between components (e.g., 110, 140, 150, 160) of system 100. Connection points may include a mechanical interface between component, such as point, or plurality of point (e.g., portion), where the components of system 100 are in contact. Two components may be coupled via an interface either directly or indirectly. For example, two components, such as flange 140 and sleeve 110 may be in contact at an interface, such as an interface formed by first end 142 of flange 140 and lip portion 130 of sleeve 110. As another example, two components may be indirectly coupled via a connector, such as a fastener (e.g., nuts and bolts, screws, pins, a band, a clamp, and/or the like), adhesive, threading (e.g., male female connectors), weld (e.g., metal or thermoplastic from welding, soldering, brazing, or the like), or combination thereof, as illustrative, non-limiting examples. To illustrate, pipe 150 and flange 140 are coupled together via connector 170, such as a weld. In some implementations, pipe 150 and flange 140 may be in contact while being coupled together via connector 170.

In some implementations, sleeve 110 includes body portion 120 that defines a channel that extends from end 112 to end 114. Sleeve 110 may further include lip 130 extending radially away from first end 112 and configured to be positioned between flange 140 and reactor 160. In such implementations, sleeve 110 (e.g., the channel) may define a flow path that extends through flange 140 that is coupled to pipe 150 via connector 170, such as a welding point. In a particular implementation, lip portion 130 is further configured to be positioned between flange 140 and port 166 such that the channel of body 120 defines a flow path between pipe 150 and port 166.

As described with reference to FIG. 1, sleeve 110 is configured to thermally insulates flange 140 and connector 170. In implementations where reactor is a hot wall dehydrogenation reactor, the temperature of the flow path of system 100 may vary and may be altered from a high temperature to a low temperature after a predetermined time (e.g., 10 minutes) creating increased cyclic thermal stress in components of the system. In this way, sleeve 110 may decrease the stresses acting upon flange 140 and connector 170 so that these components may include materials other than specialized high-temperature materials or alloys. Accordingly, this may reduce damage/failure, reduce production costs, and allow for more flexibility in operation of system 100.

Figures 2A, 2B, 2C, 2E, 2F:
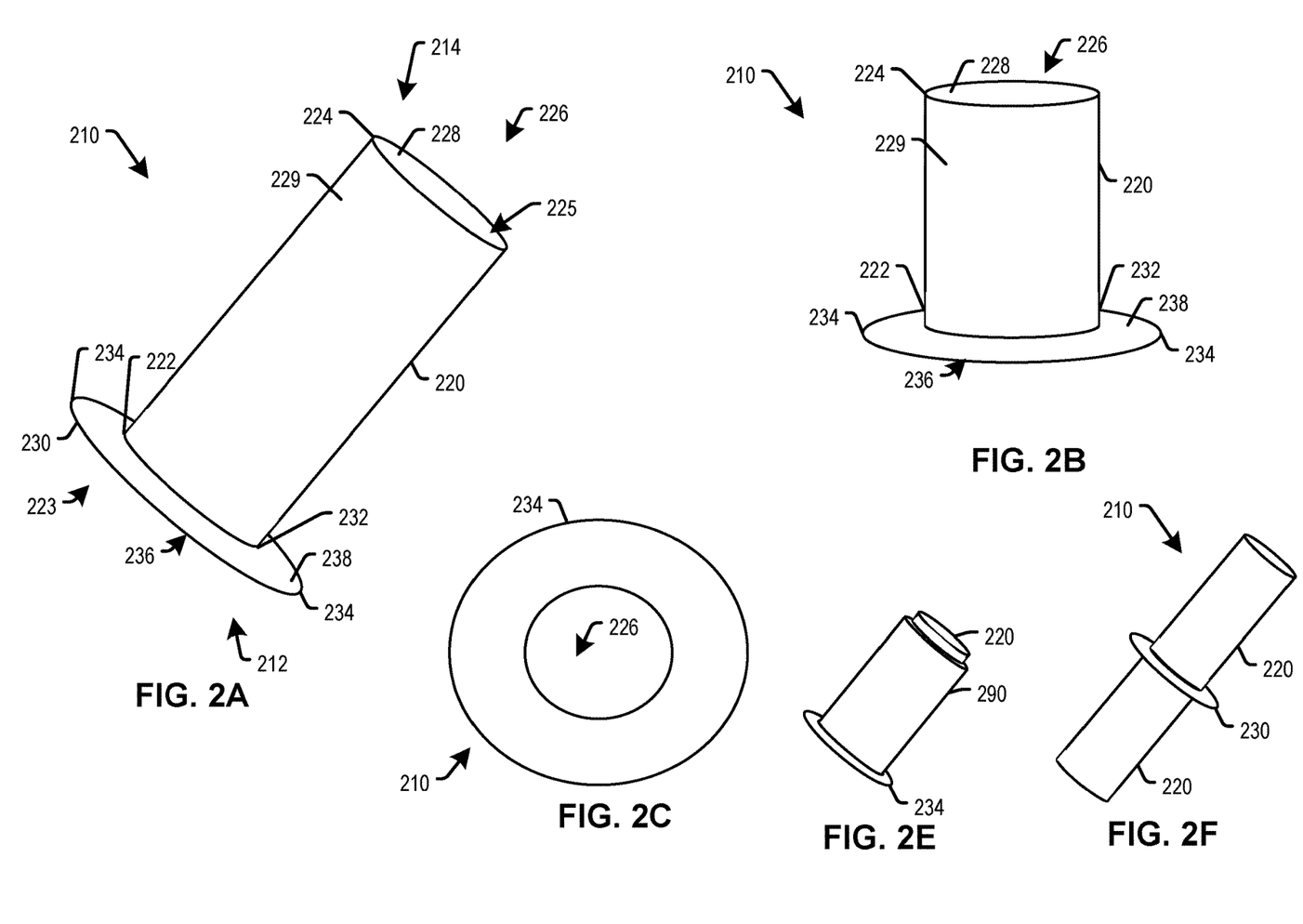
FIG. 2A is a perspective view of an example of a sleeve of the insulation system.
FIGS. 2B and 2C are a top view and a side view, respectively, of the sleeve of FIG. 2A.
FIGS. 2E and 2F are each perspective views of other examples of a sleeve.
Figure 2D:
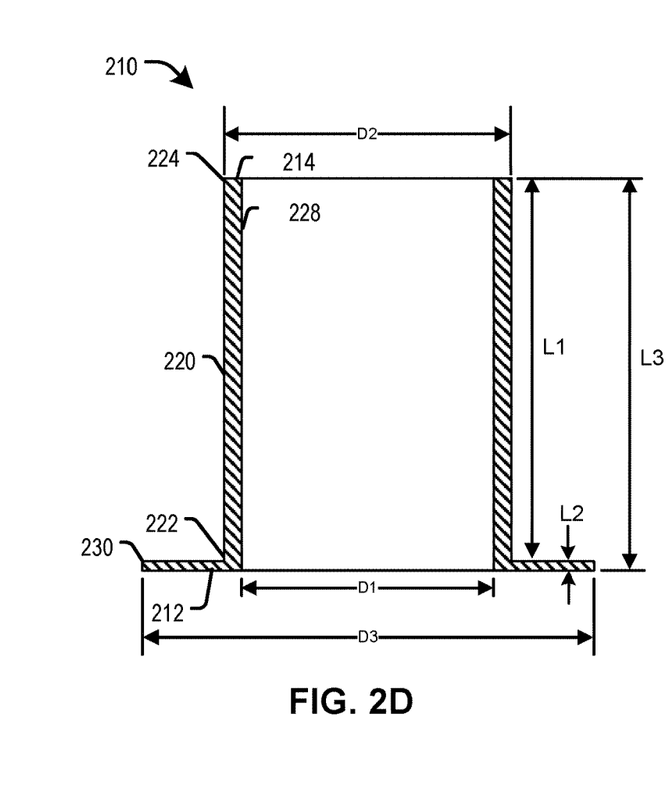
FIG. 2D is a side cross-sectional view of an example of the sleeve of the present system.

Referring now two FIGS. 2A-2F, various views of examples of a sleeve 210 are shown. For example, FIG. 2A shows a perspective view of sleeve 210, FIG. 2B shows a front view of sleeve 210, FIG. 2C shows a side view of sleeve 210, FIG. 2D shows a cross-sectional view of sleeve 210, and FIGS. 2E and 2F each show a perspective view of other examples of the sleeve. Sleeve 210 may include or correspond to sleeve 110. Sleeve 210 may be configured to provide thermal insulation for one or more other components in an insulation system, such as system 100.

Sleeve 210 includes a body portion 220 and a lip portion 230. Body portion 220 and lip portion 230 may include or correspond to body portion 120 and lip portion 130, respectively. As shown, lip portion 230 is defined at a first end 212 and body portion 220 extends from first end 212 to a second end 214. Lip portion 230 may extend radially away from body portion 220 at first end 212. For example, body 220 may extend in a first direction that is angularly disposed relative to a second direction in which lip 230 extends. To illustrate, body 220 may extend in a direction that is substantially orthogonal to lip 230. As described, body portion 220 and lip portion 230 are unitary (e.g., cast or forged together), while in other implementations, body 220 and lip 230 may form distinct components that are coupled together via any suitable means, such as a weld.

Body portion 220 includes a first end 222, a second end 224, an inner surface 228 and an outer surface 229. As shown, first end 222 is opposite second end 224. First end 222 of body portion 220 may include or correspond to first end 212 of sleeve 210. Additionally, or alternatively, second end 224 of body 220 may include or correspond to second end 214 of the sleeve 210. As shown, inner surface 228 and outer surface 229 extend from first end 222 to second end 224. In some implementations, inner surface 228 and outer surface 229 may be opposing surfaces of body portion 220. Inner surface 228 may define an opening at each of first and second ends 222, 224. For example, inner surface 228 defines a first opening 223 at first end 222 and a second opening 225 at second end 224. In such implementations, body portion 220 (e.g., inner surface 228) defines a channel 226 which may extend from first opening 223 to second opening 225 to define a flow path, or at least a portion of longer flow path of a system (e.g., 100). To illustrate, channel 226 may define a portion of the flow path that extends through a flange, such as flange 140. As shown, body portion 220 includes a right circular hollow cylindrical member; however, in other implementations, the body portion may be shaped and sized to define a channel (e.g., 226) of any suitable shape, such as polygonal (e.g., square, rectangular, hexagonal, octagonal, and/or the like), elliptical, and/or the like. Additionally, or alternatively, body portion 220 may include one or more bends or curves such that the longitudinal axis of the channel (e.g., 226) does not lie in a single plane. It is further noted that body portion 220 may include one or more heat dissipation features, such a fins, ridges, etc., that extend from inner surface 228 into channel 226.

Lip portion 230 includes a first end 232, a second end 234, a first surface 236, and a second surface 238. First and second surfaces 236, 238 may each extend from first end 232 to second end 224. As shown, first surface 236 may include a surface of lip portion 230 that is opposite to second surface 238. In some implementations, lip portion 330 defines an annular member extending from body portion 220 at first end 222. The term annular member is not limited to a circle, but may include any member defined by the area between two concentric shapes. In some implementations, lip portion 230 extends radially away from first end 222. For example, first end 232 of lip portion 230 may contact, or be coupled to, first end 222 of body portion 220 and extend radially away from the body portion to second end 234. In some implementations, lip portion 230 extends away from body portion 220 along a plane that is orthogonal to the longitudinal axis of channel 226. In other implementations, lip portion 230 may extend radially away from any suitable portion (e.g., a center portion) of body portion 220. In the depicted implementations, first end 222 and second end 224 of lip portion are circular; however, each end of lip portion 230 may define any suitable shape, such as polygonal (e.g., square, rectangular, hexagonal, octagonal, and/or the like), elliptical, an irregular shape, a combination thereof, and/or the like. It is further noted that lip 230 may include one or more heat dissipation features, such a fins, ridges, etc., that extend outward from lip 230, such as outward from first surface 236, second surface 238, an edge surface between first and second surfaces 236, 238, or a combination thereof.

In some implementations, lip portion 230 is configured to be positioned between one or more components of a system (e.g., 100). For example, lip portion 230 may be positioned between a flange (e.g., 140) and a port (e.g., 166) of a reactor (e.g., 160). In such implementations, body portion 220 may extend through an opening of the flange or the reactor to define a portion of the flow path of the system. In some implementations (e.g., where lip portion 230 extends from a center portion of body portion 220) lip portion 230 may be positioned between two components and body portion 220 may extend through both components to reduce stresses acting on the components, as described herein and as shown at least with reference to FIG. 2F. As described above, body portion 220 may define the flow rate instead of the flange, a portion of a pipe, a connection (e.g., 170) between the flange and the pipe, etc. Accordingly, sleeve 210 may decrease the forced convection acting on one or more other components or connectors of the system. In some implementations, lip portion 230 may define one or more aperture(s) (e.g., thru holes) that extend from first surface 236 to second surface 238. The aperture(s) may be configured to accept one or more fasteners to couple sleeve 210 to one or more other components, such as the flange or the reactor. In some implementations, aperture(s) may be circular, however, lip portion 230 may define aperture(s) in any suitable size and shape to facilitate coupling of sleeve 210.

In some implementations, sleeve 210 includes body portion 220 that defines channel 226 that extends from first end 222 to second end 224. Sleeve 210 also includes lip portion 230 extending radially away from first end 222 and configured to be positioned between a flange and a reactor. In such implementations, channel 226 is configured to define a flow path that extends through the flange that is coupled to a pipe via a connection, such as a welding point. In a particular implementation, lip 230 is further configured to be positioned between the flange and a port of a reactor such that channel 226 defines a flow path between the pipe and the port.

In one or more implementations, lip portion 230 extends between first end 232 that is coupled to first end 222 of body portion 220 and second end 224. In some such implementations, channel 226 defines a longitudinal axis that is orthogonal to a surface of lip portion 230. In some implementations, body portion 220 defines first opening 223 at first end 222 and second opening 225 at second end 224 of body portion 220.

Referring now to FIG. 2D, a longitudinal cross-section of sleeve 210 is shown. The longitudinal cross-section is taken along a plane that bisects and is parallel to the longitudinal axis of channel 226. As shown, sleeve 210 includes body portion 220 that extends between first and second ends 222, 224 and lip portion 230 that extends radially away from body portion 220 at first end 222. In some implementations, sleeve 210 (e.g., 220 and 230) may be shaped and sized to facilitate the insulation of one or more other components (e.g., 140, 150, 160) and/or connectors (e.g., 170) of a system, such as system 100.

Sleeve 210 may include a first distance D1 that defines a maximum transverse dimension of channel 226 taken along a plane orthogonal the longitudinal axis of channel 226. First distance D1 may be measured from opposing sides of inner surface 228 of body portion 220. In some implementations, first distance D1 corresponds to a diameter of channel 226. Sleeve 210 may also include a second distance D2 that defines a maximum transverse dimension measured between opposing sides of outer surface 229. To illustrate, second distance D2 may correspond to an outer diameter of body portion 220. Second distance D2 may be greater than first distance D1. In some implementations, first distance D1 is greater than or equal to any of, or between any two of, the following: 450, 475, 500, 525, 550, 575, 600, 625, 650, 675 or 700 millimeters (mm) (e.g., approx. 584 mm). In some implementations, second distance D2 is greater than or equal to any of, or between any two of, the following: 475, 500, 525, 550, 575, 600, 625, 650, 675, 700 or 725 millimeters (mm) (e.g., approx. 604 mm). D2 may be obtained by: D1+ (two times a thickness of body portion 220). In some implementations, the thickness may be between 3 to 15 mm.

In the depicted implementation, sleeve 210 also includes a third distance D3 that defines a maximum transverse dimension of lip portion 230 measured between opposing sides of second end 224. In some implementations, third distance D3 corresponds to a diameter of lip portion 230. As shown, third distance D3 is greater than first distance D1 and second distance D2 so that lip portion forms an overhang. For example, D3 may correspond the maximum transverse dimension of sleeve 210. In some implementations, third distance D3 corresponds to a dimension that covers a face of a flange (e.g., 140) and/or a specified gasket to be placed between the sleeves.

Sleeve 210 may also include a first length L1 that defines a distance measured between first end 222 of body portion 220 and second end 224. To illustrate, first length L1 (e.g., body length) corresponds to the length of body portion 220. In some implementations, a first length L1 extends in the same plane as first distance D1, second distance D2, and third distance D3 and in a direction that is perpendicular to the distances (e.g., D1-D3).

In some implementations, first length L1 (e.g., body length) is greater than or equal to at least one of first distance D1, second distance D2, and third distance D3. For example, body length L1 is greater than or equal to any of, or between any two of, the following: 300, 400, 500, 600, 700, 800, 900, or 1,000 mm. In some implementations, L1 may be limited based on bend in a pipe (e.g., 150) coupled to the sleeve, by lining placed within the pipe (e.g., between the pipe and the sleeve), by desired flow characteristics, or the like. Additionally, or alternatively, sleeve 210 may include a second length L2 (e.g., 229) that is defined by a distance measured between first surface 236 and second surface 238 of lip portion (e.g., thickness). In some implementations, second length L2 (e.g., lip thickness) corresponds to a thickness of lip portion 230. As shown, body length L1 is greater than lip thickness L2. In some implementations, body length L2 is greater than or equal to any of, or between any two of, the following: 2, 3, 4, 5, 6, 7, 8, 9, 10, 11, 12, 13, 14, or 15 mm. Additionally, sleeve may include a third length L3, such as maximum length of sleeve 210, from first end 212 to second end 214.

Referring to FIG. 2E, an insulating member 290 (e.g., an insulating ring) is coupled to sleeve 210. Insulating member 290 may include ceramic, ceramic wool, other material, the like, or a combination thereof. Insulating member 290 may have a length that is less than or equal to L1. Alternatively, insulating member 290 may have a length that is greater than or equal to L1. Referring to FIG. 2F, sleeve 210 is shown having two body portions 220 and a lip portion 230. The two body portions 220 may include a single body to which lip 230 is attached (e.g., fixed), such as by welding lip portion 230 to body portion 220. Additionally, or alternatively, a length of each of the two body portions 220 may be the same or different.

Figure 3A:
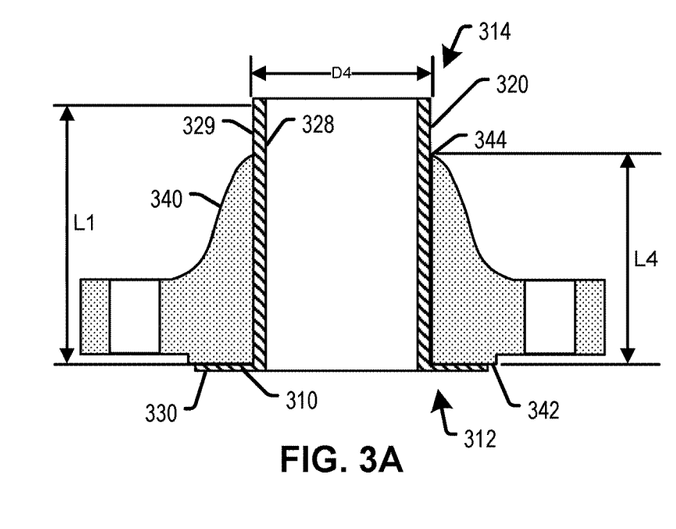
FIGS. 3A and 3B are side cross-sectional views of the sleeve and a first example of a flange and a second example of a flange, respectively, of the insulation system.
Figure 3B:
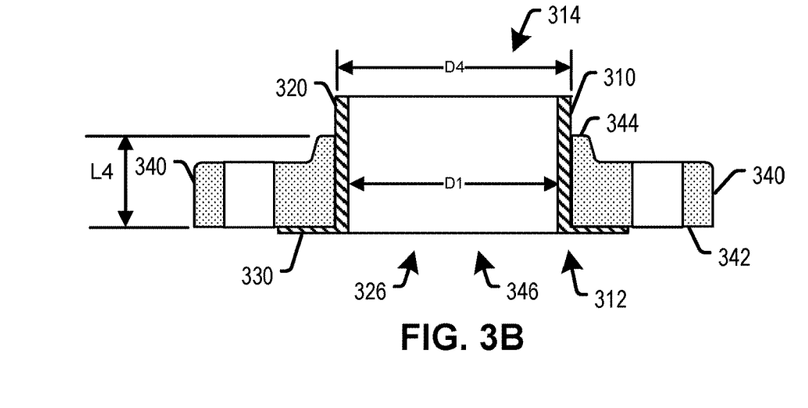

Referring now to FIGS. 3A-3B, examples components of a system are shown coupled together. For example, as shown in FIG. 3A-3B, cross-sectional views of examples of a sleeve 310 are shown coupled to various examples of a flange 340. To illustrate, FIG. 3A shows a cross-sectional view of sleeve 310 coupled to a first example of flange 340 (e.g., a weld neck flange) and FIG. 3B shows sleeve 310 coupled to a second example of flange 340 (e.g., a lap joint flange). The first and second examples of flange 340 may include or correspond to flange 140.

Sleeve 310 may include or correspond to sleeve 110 or 210. For example, sleeve 310 includes a body portion 320 that extends from a first end 312 to a second end 314 and a lip portion 330 that extends radially away from the body portion at first end 312. Body portion 320 may include or correspond to body portion 120, 220, and lip portion 330 may include or correspond to lip portion 130, 230. In some implementations, sleeve 310 does not include a lip portion 330. Body portion 320 includes an inner surface 328 and an outer surface 329. As shown, a first end 312 of sleeve 310 may be coupled to a first end 342 of flange 340. In this way, first end 312 of sleeve and first end 342 of flange 340 may each be coupled to one other component (e.g., a reactor) of a system. A second end 314 of sleeve 310 may be at an opposite end from first end 312.

Flange 340 includes a first end 342, a second end 344. As shown, flange 340 extends from first end 342 to second end 344 that is opposite the first end 342. Flange 340 may also define a channel 346 (e.g., second channel) that extends from the first end 342 to second end 344. In some implementations, lip portion 330 may be coupled to first end 342 of flange 340 such that body portion 320 extends through flange 340 to define at least a portion of a flow path.

Channel 346 of flange 340 may include a fourth distance D4 that defines a maximum transverse dimension of channel 346 taken along a plane orthogonal the longitudinal axis of channel 346. In some implementations, D4 may correspond to a diameter of channel 346. As shown, fourth distance D4 of channel 346 is greater than or equal to second distance D2 of sleeve 310 such that body portion 320 can be inserted within flange 340. In such implementations, channel 346 may be shaped similar to body portion 320 of sleeve 310. In some implementations, a gap (e.g., flange gap and/or a gap between sleeve and a pipe) separates outer surface 329 of sleeve 310 and an inner surface (that defines channel 346) of flange 340. For example, the flange gap may be defined as a distance between outer surface 329 of body portion 320 and a sidewall of flange that defines channel 346. In some implementations, flange gap may be greater than or equal to any of, or between any two of, the following: 1, 2, 3, 4, 5, 6, 7, 8, 9, or 10 mm. In this way, the flange gap may allow for thermal expansion of sleeve 210 during operation of system without, or with minimal, contact forces between the sleeve 310 (e.g., body portion 320) and the flange 340. In some implementations, flange gap (and/or a gap between the sleeve and the pipe) may be at least partially or completely filled with an insulation-type material, such as biopersistent fibers, Polycrystalline fibers, refractory ceramic fiber, ceramic wool, mineral wool, fiberglass, or the like. For example, flange gap may include a ceramic wool filling. In some implementations, the insulation-type material may have a ring or cylinder shape, as illustrative, non-limiting examples.

Flange 340 may include a fourth length L4 that is defined by a distance measured between first end 342 and second end 344 of flange 340. L4 (e.g., flange length) may correspond to a length of channel 346. In such implementations, L1 (e.g., body length) is greater than L4 (e.g., a flange length). Accordingly, body portion 320 may extend past second end 344 while sleeve 310 is coupled to the flange 340. To illustrate, a surface of lip portion 330 may abut first end 342 of flange while body 320 extends from first end 342 to second end 344. In such implementations, sleeve 310 includes a first portion including a portion of body portion 320 that is configured to be positioned within channel 346 of flange 340 while sleeve 310 is coupled to flange 340 and a second portion including a portion of body portion 320 configured to be positioned outside of channel 346 while sleeve 310 is coupled to flange 340. In such implementations, first length L1 (e.g., body length) is greater than fourth length L4 (e.g., flange length). In this way, sleeve 310 may define a portion of a flow path of a system (e.g., 100) that bypasses flange 340 and allows sleeve 310 to reduce the energy transfer (e.g., heat transfer) from the system (e.g., a reactor) to flange 340. Consequently, in systems (e.g., 100) with high temperature swings, cyclic thermal stress acting on a component (e.g., flange 340, a pipe, or a connector—a weld point) may be decreased. In some implementations, flange 340 defines channel 346 that extends from first end 342 of flange 340 to second end 344 of flange 340. In a particular implementation, flange 340 is coupled to a port (e.g., 166) of a reactor (e.g., 160) via first end 342 of flange 340. In some implementations, channel 326 of body portion 320 includes a maximum transverse dimension (e.g., D1) that is less than or equal to 90% of the maximum transverse dimension (e.g., D4) of channel 346 of flange 340. In some implementations, flange 340 is a weld neck flange or a lap joint flange.

Figure 4A:
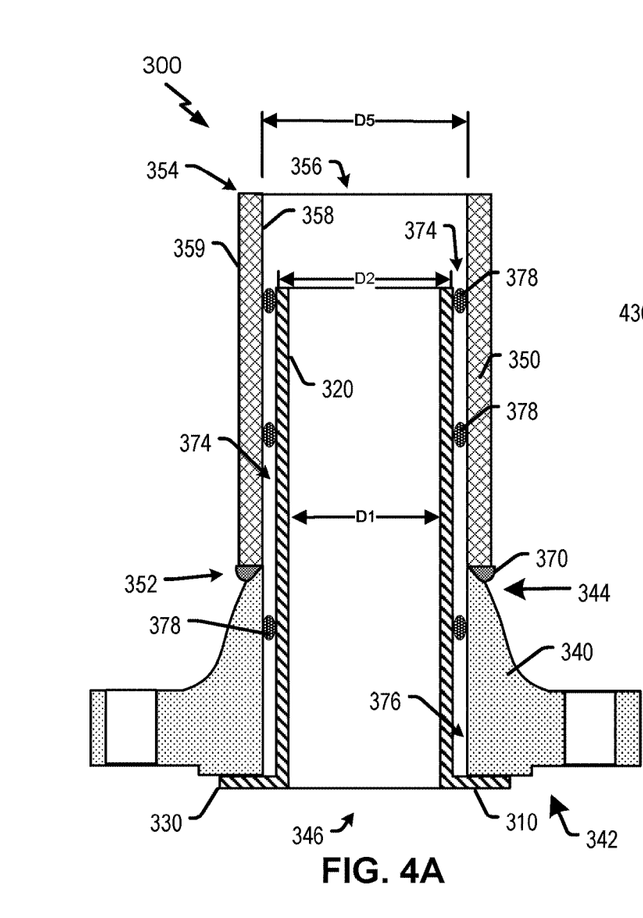
FIG. 4A is a side cross-sectional view of the sleeve and flange of FIG. 3A coupled to an example of a pipe of the insulation system.
Figure 4B:
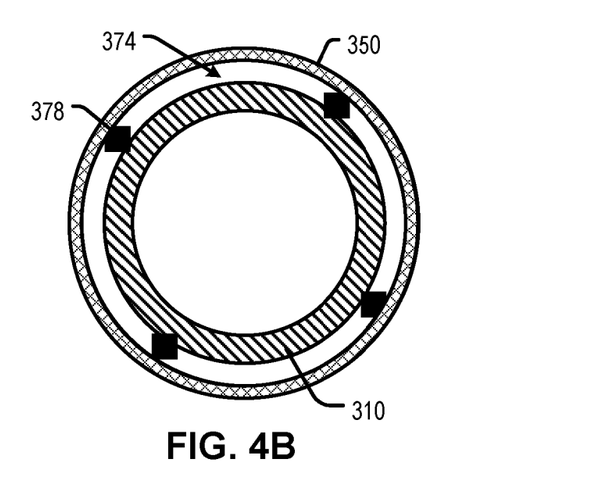
FIG. 4B is a top view of the sleeve and pipe of FIG. 4A.

Referring now to FIGS. 4A-4B, various views of sleeve 310 and flange 340 coupled to a pipe 350 via a connector 370 are shown. FIG. 4A shows a side cross-sectional view of sleeve 310 coupled to flange 340 and pipe 350 and FIG. 4B shows a partial top cross-sectional view of the sleeve and pipe. Pipe 350 may be coupled to flange 340 and/or sleeve 310 to define at least a portion of the flow path of a system (e.g., 100). As shown, sleeve 310, flange 340, and pipe 350 are coupled in a first configuration to define at least a portion of the flow path. While in the first configuration, one or more other components (e.g., reactor 160) may be connected to the first end 312 of sleeve and/or the second end 354 of pipe 350 to further define the flow path.

Pipe 350 may include or correspond to pipe 150. Pipe 350 may include a first end 352, a second end 354, an inner surface 358, and an outer surface 359. Additionally, pipe 350 (e.g., inner surface 358) may define a channel 356. As shown, first end 352 is opposite of second end 354 and each of inner surface 358 and outer surface 359 extend from first end 352 to second end 354. Inner surface 358 and outer surface 359 may be opposing surfaces of pipe 350. In some implementations, inner surface 358 of pipe 350 may define an opening at each of the first and second ends 352, 354. To illustrate, pipe 350 defines a first opening at first end 352 and a second opening at second end 354. In such implementations, channel 356 (e.g., third channel) is defined by inner surface 358 between the first opening and the second opening of pipe 350. As shown pipe 350 is a right hollow cylindrical member (e.g., straight pipe); however, pipe 350 may be any suitable size or shape. For example, pipe 350 may include one or more bends (e.g., a long radius elbow pipe). Additionally, or alternatively, pipe 350 may be tapered (e.g., a flared cone).

Pipe 350 may include a fifth distance D5 that defines a maximum transverse dimension of channel 356 taken along a plane orthogonal the longitudinal axis of channel 356. In some implementations, pipe 350 is coupled to flange 340 such that channel 346 of flange 340 is aligned with channel 356 (e.g., coaxial) of pipe 350. For example, first end 352 of pipe 350 may be coupled to second end 344 of flange 340 to define a flow path. In some implementations, channel 356 has a maximum transverse dimension that is substantially equal to the maximum transverse dimension of channel 346. As shown, fifth distance D5 of channel 356 is greater than second distance D2 of sleeve 310 such that body portion 320 (e.g., of 310) can be inserted into and/or through flange 340.

In some implementations, a gap 374 separates sleeve 310 and pipe 350 such that body portion 320 and pipe 350 are not in contact. For example, gap 374 may be defined as a distance between outer surface 329 of body portion 320 and inner surface 358 of pipe 350. Additionally, or alternatively, gap 376 (e.g., flange gap) may body portion 320 from flange 340. In the depicted implementations, gap 374 is substantially equal to flange gap 376; however in other implementations, gap 374 may be greater than or less than flange gap 376. For example, in some implementations, sleeve 310 may be tapered at first end 312 so that gap 374 is greater than flange gap 376. In this way, flow through a flow path does not create significant back flow as fluid moves from pipe 350 to sleeve 310. In other implementations, the length of the second portion of body portion 320 is sufficiently long so sleeve 310 does not need to be tapered. In the described implementations, when sleeve 310 is inserted into pipe 350, the length of the second portion allows for a gradual expansion ratio of fluid to properly insulate one or more components.

Connector 370 is configured to couple pipe 350 to flange 340 and/or sleeve 310. For example, first end 352 of pipe 350 and second end 344 of the flange 340 may form a connection point (e.g., joint) that is attached by connector 370. In some implementations, pipe 350 and flange 340 may be metal (e.g., steel) and connector 370 may include a weld. To illustrate, first end 352 of pipe 350 may be connected to second end 344 of flange via welding (e.g., 370) such as, for example, heat welding, ultrasonic welding, and/or the like. As shown, sleeve 310 may be disposed within flange 340 while pipe 350 is coupled to flange 340 or, alternatively, pipe 350 may be disposed around sleeve 310 while sleeve 310 is coupled to flange 340. For example, body 320 may be positioned within channel 346 and/or channel 356 while lip 330 is coupled to first end 342. In a particular implementation, body 320 extends into channel 356 of pipe 350 to cover (from within) connector 370 while each of sleeve 310, flange 340, and pipe 350 are coupled together. In such implementations, the first portion of body 320 is disposed within channel 346 of flange 340 and the second portion of body 320 is disposed within channel 356 of pipe 350. Accordingly, sleeve 310 and pipe 350 may define the flow path such that the flow path bypasses flange 340 (e.g., fluid does not flow through flange 340 without flowing through sleeve 310). In this way, sleeve 310 may insulate flange 340, pipe 350, and connector 370 from heat (e.g., forced convention, thermal expansion, or other thermal stress). In such implementations, a weld (e.g., 170, 370) may be used to join pipe 350 and flange 340 without the weld cracking as a result of heat from a reactor. In some implementations, a body length (e.g., L1) of sleeve 310 may be customized such that the second portion of body 320 extends far enough into channel 356 to insulate connector 370 without contacting pipe 350. To illustrate, body length L1 may be limited in implementations of system 100 where pipe 350 includes a bend or taper (e.g., dehydrogenation reactor inlet cactus geometry).

In some implementations, pipe 350 defines channel 356, and pipe 350 is coupled to second end 344 of flange 340. In some implementations, body portion 320 includes the first portion that is disposed within channel 346 of flange 340 and the second portion that is disposed in channel 356. In a particular implementation, lip portion 330 is configured to be positioned between flange 340 and another component of system 300 (e.g., one other flange or a port 166 of a reactor 160 such that the first portion of body portion 320 is disposed within channel 346 of flange 340 and the second portion of body portion 320 is disposed within channel 356 of pipe 350 coupled to flange 340 via an interface (e.g., 370). In such implementations, the interface may include a weld.

In some implementations, one or more connectors 378 may couple sleeve 310 to pipe 350 and/or flange 340. For example, FIG. 4B shows connectors 378 may include a weld (e.g., tack weld) that couples outer surface (e.g., 329) of body portion 320 to inner surface 358 of pipe 350. Connectors 378 may be used to couple outer surface 329 of body 320 to flange 340. In some implementations, connectors 378 may couple body 320 to pipe 350, couple body 320 to flange 340, a couple body 320 to both pipe 350 and flange 340 (as shown in FIG. 4A), or a combination thereof. In such configurations, sleeve 310 may be coupled to pipe 350 or flange 340 with or without lip 330 of sleeve 310. As shown, connectors 378 include 4 connectors equally spaced about body 320; however, any suitable number of connectors may be used and the spacing need not be equal. In some implementations, each connector 378 may include a weld (e.g., tack weld, heat welding, ultrasonic welding, and/or the like), a fastener (e.g., bolt, screw), or the like. In some implementations, an insulative material (e.g., ceramic wool) may be disposed in gap 374 and/or gap 376 to enhance flow properties and provide insulation. In a particular implementation, one or more connectors may be configured to define a chamber or a cavity that includes the insulative material and/or an insulating member, such as insulating member 290. In a particular implementation, insulative material may be positioned in a gap(s) 374, 376, an insulating member (e.g., 290) is positioned at an end of body 320 (within gap 374 and/or 376), and one or more connectors 378 are positioned at the end of body 320 and maintain insulating member (e.g., 290).

Figure 5A:
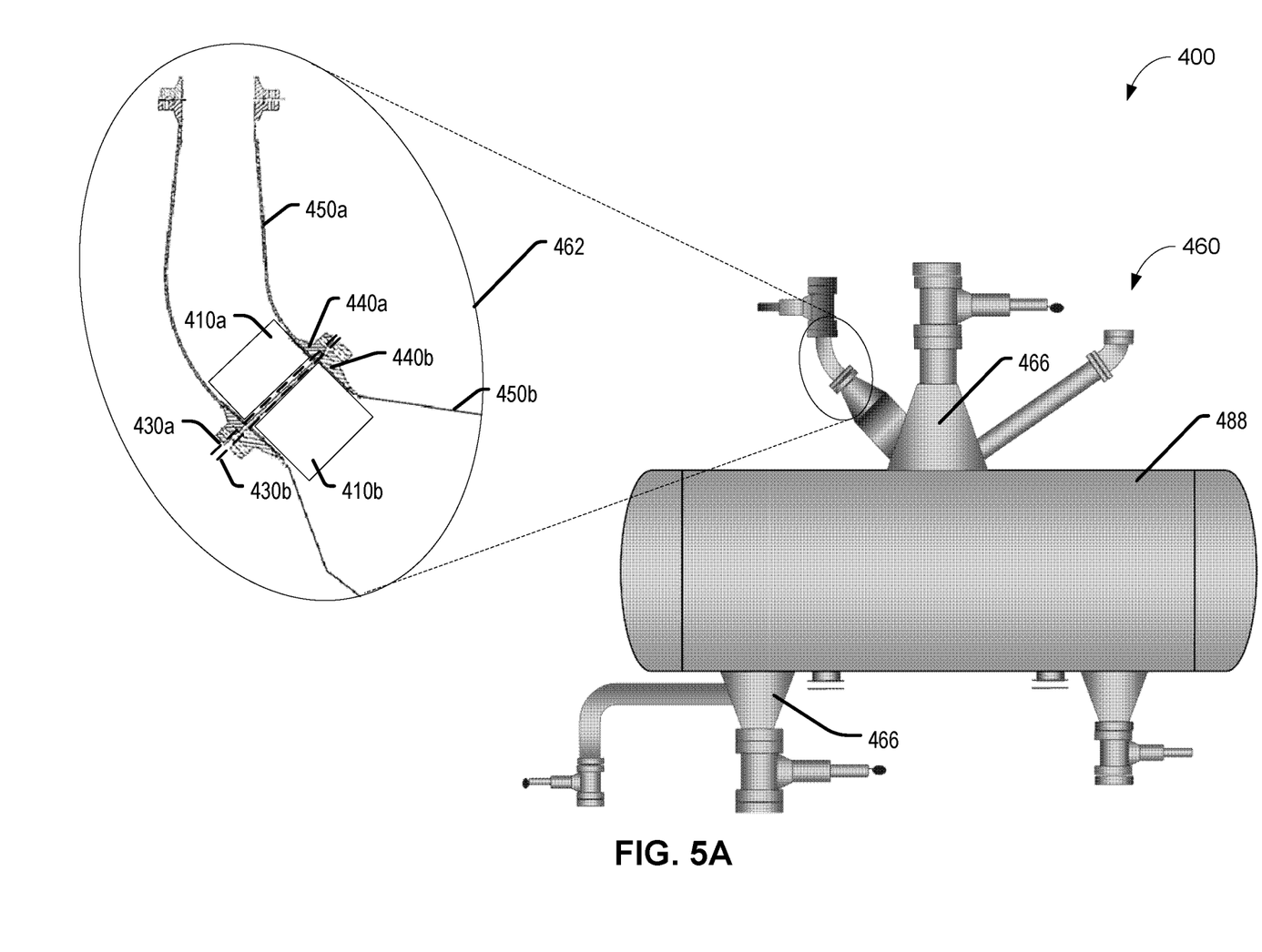
FIG. 5A is a side view of an example of a dehydrogenation reactor.
Figure 5B:
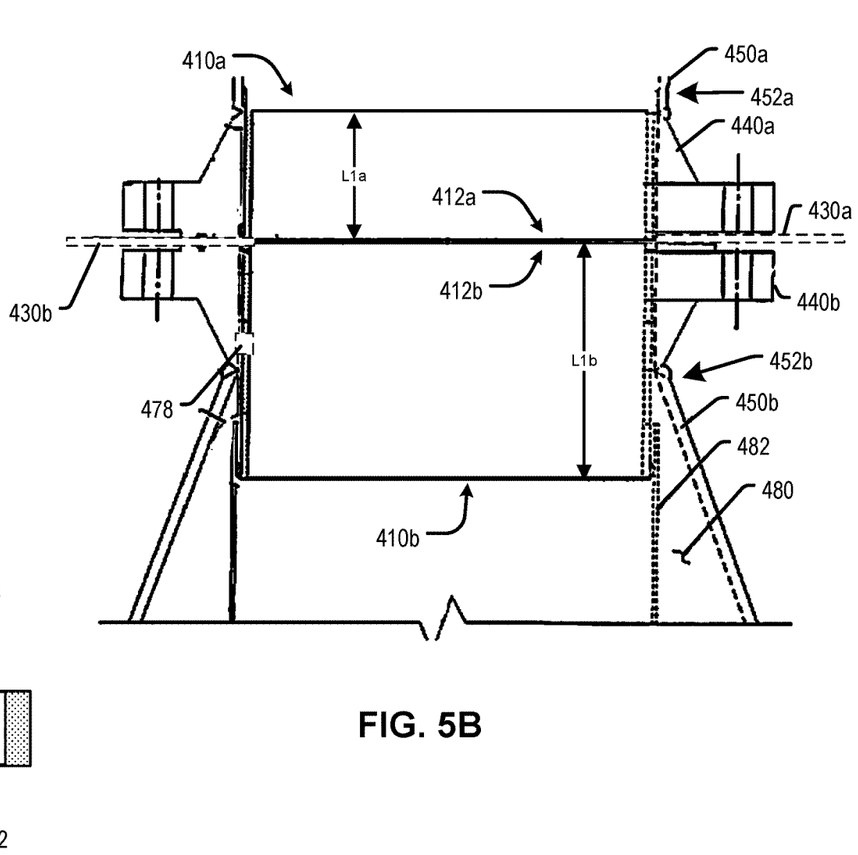
FIG. 5B is an enlarged cross-sectional view of a portion of FIG. 5A.

Referring to FIG. 5A-5B, examples of a system are shown in operation to shield one or more components of the system from heat. For example, FIG. 5A is a side view of a reactor 460 (e.g., a dehydrogenation reactor) with inlet and outlet piping including of one or more pipes, in particular, pipe 450a, 450b and flanges 440a and 440b are shown. For example, the inlet piping may include cactus piping 466. An exploded cross-sectional view of a portion of the inlet piping of reactor 460 having two sleeves 410a and 410b, where each sleeve is coupled to a flange 440a and 440b, respectively, and extends through the flange into a portion of a pipe 450a and 450b, is shown at and designated in expanded view 462. Reactor 460 may include or correspond to reactor 160 and may include one or more ports (e.g., 166). Flange 440a, 440b and pipe 450a, 450b may include or correspond to flange 140, 340 and pipe 150, 350, respectively. Additionally, or alternatively, sleeve 410a, 410b may include or correspond to sleeve 110, 210, 310. In some implementations, a flow path of the system that communicates with chamber 488 of reactor 460 where a reaction (e.g., chemical) occurs.

As shown, the system may include a first pipe 450a (e.g., a hot wall pipe) and a second pipe 450b (e.g., a cold wall pipe) positioned upstream from chamber 488. In such implementations, flow (e.g., of gas) may enter first pipe portion 450a and be provided to second pipe portion 450b. Each of 450a and 450b may be coupled to a corresponding flange 440a, 440b. For example, first end 452a of first pipe 450a is coupled to a first flange 440a and first end 452b of second pipe 450b is coupled to a second flange 440b. Each flange 440a, 440b may be coupled to a sleeve 410a and 410b respectively, and the first and second flange 440a, 440b may be coupled together such that a first sleeve 410a and a second sleeve 410b define a portion of a flow path of the system. In some implementations, first end 412a of first sleeve 410a is coupled to first end 412b of second sleeve 410b. In a particular implementation, a gasket may be placed between the first and second sleeves 410a, 410b and/or between a respective sleeve and flange. A portion of each sleeve 410a or 410b may extend through a respective flange 440a or 440b to divert the flow path from the interfaces between the pipes 450a and 450b and the flanges 440a and 440b. In some implementations, at least one sleeve 410a and/or 410b may define a gap between an outer surface of the sleeve and respective pipe 450a or 450b in which the sleeve is disposed. As explained above, an insulative material (e.g., ceramic wool) may be disposed in the gap to enhance flow properties and further insulate components of the system.

Referring now to FIG. 5B, a detailed cross-sectional view of a portion of the inlet piping of reactor 460 having two sleeves 410a and 410b, each coupled to flange 440a or 440b, respectively, and extends through the flange into a portion of pipe 450a or 450b. In some such implementations, a first sleeve (e.g., 410a) and second sleeve (e.g., 410b) disposed within the respective flanges to define the flow path of the system that bypasses the flanges and prevents failure of the components of the system. In the depicted implementation, a length L1a and L1b of the first and second sleeves 410a, 410b may be different due to the geometry of the pipes 450a, 450b (e.g., a bend, taper, or liner). To illustrate L1a of first sleeve 410a is limited by a bend in first pipe 450a (as shown in FIG. 5B) and L1b of second sleeve 410b is limited by the need to extend the sleeve past a refractory liner 480 or for a refractory shroud 482 of the internal refractory in second pipe 450b. For example, length L1a of first sleeve 410a may be less than length L1b of second sleeve 410b.

In some implementations, a first flange (e.g., 440a) may be coupled to a second flange (e.g., 440b) such that the first ends of the first and second flanges are in contact to form an interface. In some implementations, lip portion 430a of sleeve 410a and/or lip portion 430b of sleeve 410b may be positioned between the interface of the first and second flanges (440a, 440b) to help secure the sleeve to the flanges. In other implementations, a sleeve (e.g., 410a and/or 410b) may not include lip portion and may be coupled to flange 440a or 440b and/or pipe 450a or 450b via one or more connectors 478. In either implementation, a gap (e.g., flange gap or pipe gap) may be filled with an insulative material such as biopersistent fibers, Polycrystalline fibers, refractory ceramic fiber, mineral wool, fiberglass, or the like.

As described above, the sleeve is configured to thermally insulate the flange, the pipe, and/or an interface (e.g., a connector or weld). In implementations where reactor is a hot wall dehydrogenation reactor, the temperature of the flow path of the system may vary and may be altered from a high temperature to a low temperature after a predetermined time (e.g., 10 minutes) creating increased cyclic thermal stress in components of the system. In this way, the sleeve may decrease the stresses acting upon the flange and/or the connector so that these components may include materials other than specialized high-temperature materials or alloys. Accordingly, this may reduce production costs and allow for more flexibility in operation of system 400.

Figure 6:
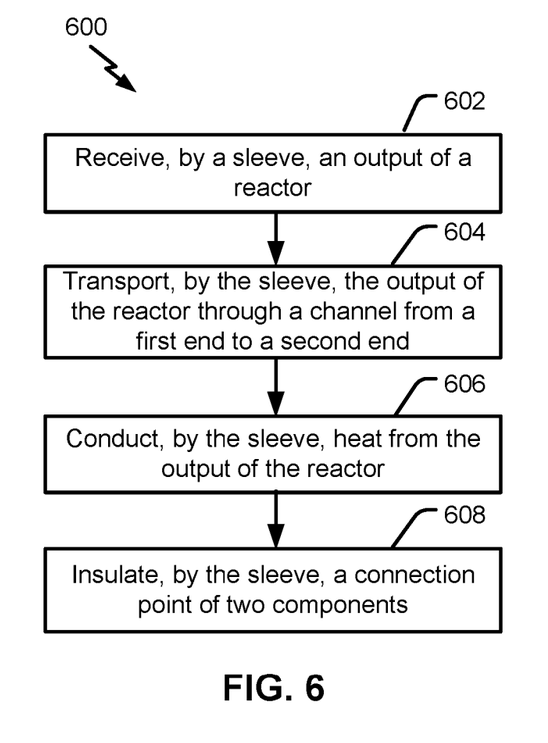
FIG. 6 is a flowchart of an example of a method of insulating an interface between components of a reactor.

Referring to FIG. 6, a method 600 of insulating an interface between two components of a reactor is shown. Method 600 may be performed at, by, or with system 100, 400, or one or more components of system 100 or the system of FIG. 4. Method 600 includes receiving, by a sleeve positioned between two components of a system, an output of the reactor, at 602. The sleeve may include or correspond to sleeve 110, 210, 310 and reactor may include or correspond to reactor 160, 460. For example, sleeve may include a body portion that defines a channel that extends from a first end to a second end of the body portion and a lip portion extending radially away from the first end of the body portion. Method 600 includes transporting, by the sleeve, the output of the system through the channel of the body portion from the first end to the second end, at 604. In some implementations, method 600 includes defining a flow path from the reactor, to the port, to an inlet of the channel of the body, to an outlet of the channel of the body, and to the pipe. Method 600 further includes conducting, by the sleeve, heat from the output of the reactor, at 606, and insulating, by the sleeve, a connection point of the two components, at 608. For example, the sleeve may cover a connector of the system from the output and/or input of the reactor such that a flow path through the sleeve bypasses a component of the system. In some implementations, method 600 includes positioning the sleeve to block the flow path from the connector.

In some implementations, method 600 includes positioning the lip portion between the flange and the port such that a first portion of the body portion is disposed within a channel of the flange and a second portion of the body portion is disposed within a channel of the pipe. In some such implementations, the first portion of the body portion defines an inlet of the channel and the second portion of the body portion defines an outlet of the channel. In a particular implementation, the inlet and the outlet are positioned outside the channel of the flange.

In some implementations, method 600 may include coupling a first component of the system to another component of the system. To illustrate, the sleeve may be coupled to a port of the reactor. Additionally, or alternatively, method 600 may further include positioning the body of the sleeve within the two components. For example, the two components may include a flange and a pipe. In some implementations, components of the system may be coupled to each other by a connector, such as a weld, at a connection point. For example, method 600 may include welding a first component of the system to a second component of the system.

In other implementations, method 600 may include receiving an input rather than an output. In some implementations, the reactor is a hot-wall dehydrogenation reactor. In such implementations, the output of the reactor may include an exhaust gas. In such implementations, method 600 may include defining a flow path from the pipe, to an inlet of the channel, to an outlet of the channel, to the port, to the reactor. Further, method 600 may include directing the exhaust gas from the pipe through the channel to a location that is downstream from the connection point. Accordingly, method 600 may conduct heat from the exhaust gas of the reactor.

The above specification and examples provide a complete description of the structure and use of illustrative configurations. Although certain configurations have been described above with a certain degree of particularity, or with reference to one or more individual configurations, those skilled in the art could make numerous alterations to the disclosed configurations without departing from the scope of this invention. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure. The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A system for transferring heat associated with an interface corresponding to a reactor, the system comprising:
    a flange coupled to a pipe via a welding point, the flange defining a channel of the flange having a length defined by a distance measured between a first end and second end of the channel of the flange;
    a sleeve comprising a body portion having a first opening and second opening, where the sleeve defines a channel of the body portion that extends from a first end to a second end of the body portion, the channel of the body portion configured to define a flow path that extends through the flange that is coupled to a pipe via a welding point;
    a lip portion extending radially away from the first end of the body portion and configured to be positioned between the flange and a port of the reactor,
        wherein: the body portion comprises a first portion disposed within the channel of the flange and a second portion disposed within a channel of the pipe; and
        the channel of the body portion extends through the entire length of the channel of the flange and past the first end and the second end of the channel of the flange.

2. The system of claim 1, wherein: the lip portion extends between a first end of the lip portion coupled to the first end of the body portion; and
    a second end of the lip portion; and
    the channel of the body portion defines a longitudinal axis that is orthogonal to the lip portion.

3. The system of claim 2, wherein the channel of the body portion comprises a maximum transverse dimension that is less than or equal to 90% of a maximum transverse dimension of the channel of the flange.

4. The system of claim 2, wherein the flange is a weld neck flange or a lap joint flange.

5. The system of claim 1, wherein the lip portion is further configured such that the channel of the body portion defines a flow path between the pipe and the port of the reactor.

6. The system of claim 1, further comprising the reactor, wherein the flange is coupled to the port of the reactor via the first end of the flange, and the pipe is coupled to the second end of the flange.

7. The system of claim 1, wherein: the reactor comprises a hot wall dehydrogenation reactor; and the interface comprises a welding point.

8. The system of claim 1, further comprising an insulating member coupled to the sleeve, wherein the insulating member includes ceramic, ceramic wool, or a combination thereof.

9. The system of claim 1, wherein the channel of the body portion comprises a maximum transverse dimension that is less than or equal to 90% of a maximum transverse dimension of the channel of the flange.

10. The system of claim 1, wherein the flange is a weld neck flange or a lap joint flange.

11. A method of insulating an interface between two components of a reactor, the method comprising:
receiving, by the system of claim 1 positioned between two components of a reactor, an output of the reactor;
transporting, by the sleeve, the output of the reactor through the channel of the body portion from the first end to the second end;
conducting, by the sleeve, heat from the output of the reactor; and
insulating, by the sleeve, a connection point of the two components.

12. The method of claim 11, further comprising:
coupling the sleeve to the port of the reactor; and
positioning the body portion of the sleeve within the two components; and
wherein: the two components comprise the flange and the pipe; and
the output of the reactor comprises an exhaust gas.

13. The method of claim 12, further comprising:
defining a flow path from the reactor, to the port, to an inlet of the channel of the body portion, to an outlet of the channel of the body portion, and to the pipe; and
directing the exhaust gas from the reactor through the channel of the body portion to a location that is downstream from a connector.

14. The method of claim 11, wherein: the first portion of the body portion defines the inlet of the channel of the body portion;
the second portion of the body portion defines the outlet of the channel of the body portion; and
the inlet and the outlet are positioned outside the channel of the flange.

15. The method of claim 11, wherein: the reactor is a hot wall dehydrogenation reactor; and the connector comprises a weld.

16. The method of claim 12, wherein: the reactor is a hot wall dehydrogenation reactor; and the connector comprises a weld.

17. The method of claim 12, wherein:
the first portion of the body portion defines the inlet of the channel of the body portion;
the second portion of the body portion defines the outlet of the channel of the body portion; and
the inlet and the outlet are positioned outside the channel of the flange.

* * * * *